E. TURNER.
Nut-Locks.

No. 137,513. Patented April 1, 1873.

Witnesses:
G. Mathy.
Colon C. Kennon

Inventor:
Edward Turner
Per Nann & C
Attorneys.

UNITED STATES PATENT OFFICE.

EDWARD TURNER, OF GREENSBURG, PENNSYLVANIA.

IMPROVEMENT IN NUT-LOCKS.

Specification forming part of Letters Patent No. 137,513, dated April 1, 1873; application filed January 31, 1873.

*To all whom it may concern:*

Be it known that I, EDWARD TURNER, of Greensburg, in the county of Westmoreland and State of Pennsylvania, have invented a new and Improved Nut-Lock; and I do hereby declare the following to be a full, clear, and exact description of the same, reference being had to the accompanying drawing forming a part of this specification:

The invention relates to that class of devices used to prevent nuts from being turned on their screw-bolts by jarring or jolting, and thus allowing the latter to be loosened.

The invention consists in one or more disks cut away on a portion of their circumferences sufficiently to allow a nut to be applied to or removed from bolt, and of such a diameter between two opposite points of the curved part of their circumferences, that the said curved part and the corners of the nut will rotate in circles that cut each, as hereinafter described.

Figure 1:
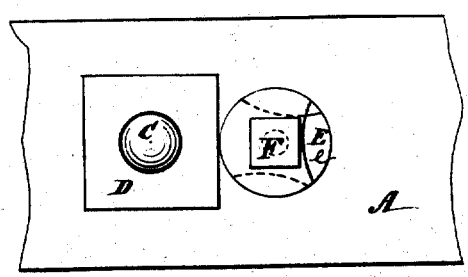
Figure 2:
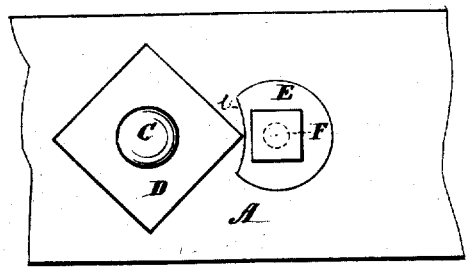
Figure 3:
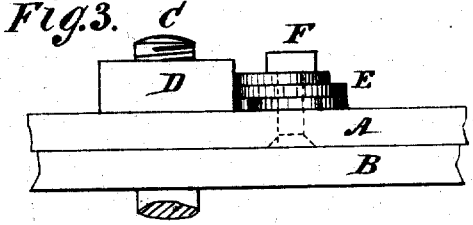
Figure 4:
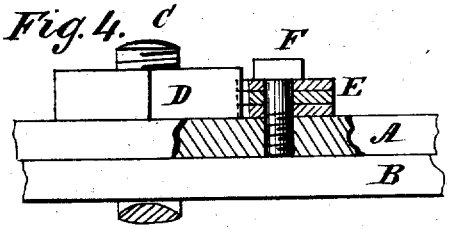
Figure 5:
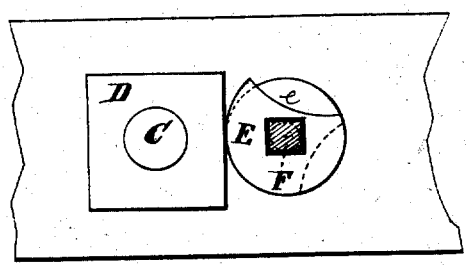

Figure 1 is a plan view of the nut-lock representing the nut locked. Fig. 2 is a plan view representing the nut unlocked. Fig. 3 is a side elevation of Fig. 1. Fig. 4 is a side elevation of Fig. 2. Fig. 5 represents a modification of my invention.

In the drawing, A is a plate required to be held rigidly to the plate B by a bolt, C, and nut D. To accomplish this, it is necessary to lock the nut so that it cannot turn, but yet in such a way that it may be readily loosened, removed, or screwed up whenever it is desired. E is a disk cut away at e and swiveled upon a rivet or screw-bolt, F. There may be two or more of these disks on the same screw-bolt, but one is sufficient to exemplify the principle of my invention. The cut-away part e of the disk, being the lightest, will have a tendency to remain always uppermost, and, therefore, to present always the curved part of its circumference toward the nut; and as the orbits of revolution of the corners of nut and the curved part of the circumference of disk cut each other, it is obvious that the nut cannot move downwardly to turn on the screw, cannot carry the disk out of its orbit, and hence that the screw cannot become loose. Whenever it is necessary to loosen the bolt or remove it, the disk E is simply turned so that the cut-away part e will face the nut, which can then be rotated and withdrawn partially or entirely.

A modification of my invention is shown in Fig. 5 of drawing, where the disk E is shown in the form of an eccentric, the application, however, being precisely the same.

Practical experiment has proven this device to be thoroughly effective in preventing fish-plate bolts from working loose, while its exceeding simplicity and cheapness render it readily available under a great variety of circumstances.

Having thus described my invention, what I claim as new, and desire to secure by Letters Patent, is—

A nut-lock, consisting of one or more disks, E, cut away at e, swiveled on a bolt, F, and applied to prevent a nut from turning on its screw, substantially as described.

EDWARD TURNER.

Witnesses:
   SOLON C. KEMON,
   CHAS. A. PETTIT.